US012115996B2

(12) United States Patent
Nahidi et al.

(10) Patent No.: US 12,115,996 B2
(45) Date of Patent: Oct. 15, 2024

(54) ARCHITECTURE AND MODEL PREDICTIVE CONTROL-BASED METHODOLOGY TO MANAGE CHASSIS AND DRIVELINE ACTUATORS (71) Applicant: GM Global Technology Operations LLC, Detroit, MI (US)

(72) Inventors: Seyedeh Asal Nahidi, North York (CA); SeyedAlireza Kasaiezadeh Mahabadi, Novi, MI (US); Ruixing Long, Windsor (CA); Yubiao Zhang, Sterling Heights, MI (US); James H. Holbrook, Fenton, MI (US); Ehsan Asadi, North York (CA); Reza Hajiloo, Waterloo (CA); Shamim Mashrouteh, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 317 days.

(21) Appl. No.: 17/518,244

(22) Filed: Nov. 3, 2021

(65) Prior Publication Data

US 2023/0140485 A1 May 4, 2023

(51) Int. Cl.
*B60W 40/101* (2012.01)
*B60W 30/02* (2012.01)
(Continued)

(52) U.S. Cl.
CPC .......... *B60W 40/101* (2013.01); *B60W 30/02* (2013.01); *B60W 40/107* (2013.01);
(Continued)

(58) Field of Classification Search
CPC .. B60W 40/101; B60W 30/02; B60W 40/107; B60W 40/109; B60W 40/114; B60W 2520/26
See application file for complete search history.

(56) References Cited

U.S. PATENT DOCUMENTS 7,330,785 B2 * 2/2008 Odenthal ............... B62D 6/003
303/146
9,340,211 B1 * 5/2016 Singh .................... B60T 8/1725
(Continued)

FOREIGN PATENT DOCUMENTS

CN      108944866 B   *  6/2021   ............ B60T 8/1755
DE    102006055550 A1  *  5/2008   ............ B60W 40/10

OTHER PUBLICATIONS

"Bakker, Egbert; Nyborg, Lars; Pacejka, Hans. "Tyre Modelling for Use in Vehicle Dynamics Studies," 1987, SAE International, SAE Transactions, 1987, vol. 96, Section 2 (1987), pp. 190-204" (Year: 1987).*

(Continued)

*Primary Examiner* — Russell Frejd
*Assistant Examiner* — Christopher R Cardimino
(74) *Attorney, Agent, or Firm* — Vivacqua Crane, PLLC (57) ABSTRACT A system for managing chassis and driveline actuators of a motor vehicle includes a control module executing program code portions that: cause sensors to obtain vehicle state information, receive a driver input and generate a desired dynamic output based on the driver input and the vehicle state information, and then estimate actuator actions based on the vehicle state information, generate one or more control action constraints based on the vehicle state information and estimated actuator actions, generate a reference control action based on the vehicle state information, the estimated actions of the one or more actuators and the control action constraints, and integrate the vehicle state information, the estimated actuator actions, desired dynamic output, reference control action and the control action constraints to generate an optimal control action that falls within a range of predefined actuator capacities and ensures driver control of the vehicle.

18 Claims, 4 Drawing Sheets

(51) Int. Cl.
 B60W 40/107 (2012.01)
 B60W 40/109 (2012.01)
 B60W 40/114 (2012.01)
(52) U.S. Cl.
 CPC ........ *B60W 40/109* (2013.01); *B60W 40/114* (2013.01); *B60W 2520/26* (2013.01)

(56) References Cited

U.S. PATENT DOCUMENTS

| | | | | |
|---|---|---|---|---|
| 10,124,807 | B2* | 11/2018 | Petrucci | B60W 30/02 |
| 10,407,035 | B1* | 9/2019 | Gadda | B60W 10/20 |
| 2006/0267750 | A1* | 11/2006 | Lu | B60C 23/062 |
| | | | | 280/5.502 |

OTHER PUBLICATIONS

"Gao, Yiqi, Model Predictive Control for Autonomous and Semiautonomous Vehicles, 2014, UC Berkeley Electronic Theses and Dissertations" (Year: 2014).*

"Chen, Yan; Wang, Junmin. "Energy-Efficient Control Allocation with Applications on Planar Motion Control of Electric Ground Vehicles," 2011, 2011 American Control Conference, The Ohio State University" (Year: 2011).*

"Kissai, Moad; Monsuez, Bruno; Tapus, Adriana; Martinez, Didier; "A new linear tire model with varying parameters," 2017, 2nd IEEE International Conference on Intelligent Transportation Engineering (ICITE)" (Year: 2017).*

"S. Antonov, A. Fehn, and A. Kugi, "Unscented Kalman filter for vehicle state estimation", 2011, Vehicle System Dynamics, vol. 49, pp. 1497-1520" (Year: 2011).*

"Berntorp, K, Olofsson, B, Lundahl, K, Nielsen, L.; Models and methodology for optimal trajectory generation in safety-critical road-vehicle manoeuvres; 2014; Vehicle System Dynamics" (Year: 2014).*

"Acosta, M, Kanarachos, S. Blundell, M; Road Friction Virtual Sensing: A Review of Estimation Techniques with Emphasis on Low Excitation Approaches; Nov. 28, 2017; Applied Sciences, MDPI" (Year: 2017).*

* cited by examiner

ARCHITECTURE AND MODEL PREDICTIVE CONTROL-BASED METHODOLOGY TO MANAGE CHASSIS AND DRIVELINE ACTUATORS

INTRODUCTION

The present disclosure relates to control systems for motor vehicles, and more specifically to systems and methods for accurately modeling automotive tire characteristics.

Static and dynamic motor vehicle control systems are increasingly being used to manage a wide variety of static and dynamic motor vehicle performance characteristics. This is especially true with respect to challenging driving scenarios involving tire slip. In many challenging driving scenarios, control actions such as wheel and/or axle torques should be allocated in an optimal manner such that tire capacity is fully utilized in longitudinal and lateral directions. Typical tire capacity management is performed within on-board computing platforms or controllers and sensors, including inertial measurement units (IMUs) to measure how the motor vehicle moves in space, referred to as vehicle dynamics. IMUs measure vehicle acceleration in three axes: x (forward/back), y (side-to-side), and z (up/down). IMUs additionally measure how quickly the motor vehicle is turning about the three axes, referred to as the pitch rate (about y), yaw rate (about z), and roll rate (about x). On-board computing platforms or controllers use the measurement data to estimate forces acting on the vehicle.

While current systems and methods distributing tire forces operate for their intended purpose, there is a need for new and improved systems and methods of tire force distribution that allow enhance vehicle stability in complex driving scenarios and which provide increased force generation at the tire/road interface or contact patch while maintaining or reducing cost and complexity, reducing calibration efforts, and improving simplicity, and while also providing increased redundancy and robustness.

SUMMARY

According to several aspects of the present disclosure, a system for managing chassis and driveline actuators of a motor vehicle includes one or more sensors disposed on the motor vehicle, the one or more of sensors measuring real-time static and dynamic data about the motor vehicle. The system further includes one or more actuators disposed on the motor vehicle, the one or more actuators altering static and dynamic characteristics of the motor vehicle. The system further includes a control module having a processor, a memory, and input/output (I/O ports, the processor executing program code portions stored in the memory. The program code portions include a first program code portion that causes the one or more sensors to obtain vehicle state information, a second program code portion that receives a driver input and generates a desired dynamic output based on the driver input and the vehicle state information, and a third program code portion that estimates actions of the one or more actuators based on the vehicle state information. The program code portions further include a fourth program code portion that generates one or more control action constraints based on the first and third program code portions, a fifth program code portion that generates a reference control action based on the vehicle state information, the estimated actions of the one or more actuators and the control action constraints, and a sixth program code portion that integrates the vehicle state information, the estimated actions of the one or more actuators, the desired dynamic output, the reference control action and the control action constraints to generate an optimal control action. The optimal control action defines a modified driver desired dynamic output control signal to the one or more actuators of the motor vehicle that falls within a range of predefined actuator capacities and maximizes driver control of the vehicle in complex driving scenarios.

In another aspect of the present disclosure the one or more sensors further comprise at least one of: inertial measurement units (IMUs) capable of measuring orientation in three dimensions, acceleration, and velocity. The one or more sensors further include Semi Active Damping Suspension (SADS) sensors capable of measuring orientation, position, velocity, acceleration in both linear and rotational aspects, and global positioning system (GPS) sensors capable of measuring a physical location of the motor vehicle. The one or more sensors further include wheel speed sensors, throttle position sensors, accelerator position sensors, steering position sensors, and tire pressure monitoring sensors.

In still another aspect of the present disclosure the real-time static and dynamic data further includes lateral velocity, longitudinal velocity, yaw rate, wheel angular velocity, and longitudinal, lateral, and normal forces on each tire of the motor vehicle.

In still another aspect of the present disclosure the second program code portion receives one or more of: a torque request from the driver; and a steering input from the driver. Based on measurements from the one or more sensors and an estimation of capacities of the one or more actuators, the torque request and the steering input from the driver are converted into a desired dynamic output that approximates vehicle dynamics that the driver input indicates.

In still another aspect of the present disclosure the third program code portion produces the estimation of capacities of the one or more actuators based on the vehicle state information and predetermined actuator capacity ranges.

In still another aspect of the present disclosure the fourth program code portion generates the one or more control action constraints from the vehicle state information and the estimation of capacities of the one or more actuators such that the control action constraints limit control signals to the one or more actuators to control actions possible within physical limitations or capacities of the actuators and fall within grip capacity of tires of the motor vehicle.

In still another aspect of the present disclosure the reference control action generated by the fifth program code portion further includes one or more of: an output command to one or more electronic limited slip differential (eLSD) actuators, an output command to one or more electronic all-wheel-drive (eAWD) actuators, and an output command to one or more active aerodynamic actuators. The output commands to the one or more eLSD, eAWD, and active aerodynamic actuators are calculated to achieve specific transient response characteristics of the motor vehicle which are linearized.

In still another aspect of the present disclosure the optimal control action generated by the sixth program code portion further includes a control signal to the one or more actuators of the motor vehicle that achieves increases motor vehicle stability, handling, maneuverability, and steerability from a first level to a second level greater than the first level for a driver input and vehicle state information at a given point in time.

In still another aspect of the present disclosure the optimal control action defines a modified driver desired dynamic output control signal to the one or more actuators of the motor vehicle increases motor vehicle performance from a first level to a second level greater than the first level while reducing or substantially eliminating control interventions, such as: a traction control system (TCS) input, a stability control system input, an antilock braking system (ABS) input.

In still another aspect of the present disclosure a method for managing chassis and driveline actuators of a motor vehicle includes processing a driver input through a control module having a processor, a memory, and input/output (I/O) ports, the processor executing program code portions stored in the memory. The program code portions: obtain vehicle state information from one or more sensors equipped to the motor vehicle, the one or more sensors measuring real-time static and dynamic data about the vehicle, receive the driver input and generating a desired dynamic output based on the driver input and the vehicle state information, and estimate actions of one or more actuators equipped to the motor vehicle based on the vehicle state information, the one or more actuators altering static and dynamic characteristics of the motor vehicle. The program code portions further generate one or more control action constraints based on the vehicle state information and estimated actions of the one or more actuators equipped to the motor vehicle, generate a reference control action based on the vehicle state information, estimated actions of the one or more actuators and the control action constraints, and integrate the vehicle state information, the estimated actions of the one or more actuators, the desired dynamic output, the reference control action and the control action constraints and generating an optimal control action based thereon. The optimal control action defines a modified driver desired dynamic output control signal to the one or more actuators of the motor vehicle that falls within a range of predefined actuator capacities and maximizes driver control of the vehicle in complex driving scenarios.

In still another aspect of the present disclosure obtaining vehicle state information further includes measuring orientation of the motor vehicle with inertial measurement units (IMUs) capable of measuring orientation, acceleration, and velocity in three or more degrees of freedom, measuring orientation of motor vehicle suspension componentry with Semi Active Damping Suspension (SADS) sensors capable of measuring orientation, position, velocity, acceleration in both linear and rotational aspects, and measuring a physical location of the motor vehicle with global positioning system (GPS) sensors. Obtaining vehicle state information further includes measuring motor vehicle wheel speed using wheel speed sensors, measuring a throttle position of the motor vehicle with throttle position sensors, measuring an accelerator pedal position with accelerator position sensors, measuring steering movement with steering position sensors, and measuring tire information with tire pressure monitoring sensors.

In still another aspect of the present disclosure obtaining vehicle state information further includes measuring a lateral velocity of the motor vehicle, measuring a longitudinal velocity of the motor vehicle, measuring a yaw rate of the motor vehicle, measuring wheel angular velocity of the wheels of the motor vehicle, and measuring longitudinal, lateral, and normal forces on each tire of the motor vehicle.

In still another aspect of the present disclosure receiving the driver input and generating a desired dynamic output based on the driver input and the vehicle state information further includes receiving a torque request from the driver, receiving a steering input from the driver; and based on measurements from the one or more sensors and an estimation of capacities of the one or more actuators, and converting the torque request and the steering input from the driver into a desired dynamic output that approximates vehicle dynamics that the driver input indicates.

In still another aspect of the present disclosure the method for managing chassis and driveline actuators of a motor vehicle further includes estimating capacities of the one or more actuators based on the vehicle state information and predetermined actuator capacity ranges.

In still another aspect of the present disclosure the method for managing chassis and driveline actuators of a motor vehicle further includes generating the one or more control action constraints from the vehicle state information and the estimation of capacities of the one or more actuators such that the control action constraints limit control signals to the one or more actuators to control signals possible within physical limitations or capacities of the actuators and so that the control signals fall within grip capacity of tires of the motor vehicle.

In still another aspect of the present disclosure generating the reference control action further includes generating an output command to one or more electronic limited slip differential (eLSD) actuators, generating an output command to one or more electronic all-wheel-drive (eAWD) actuators, and generating an output command to one or more active aerodynamic actuators. The output commands to the one or more eLSD, eAWD, and active aerodynamic actuators are calculated to achieve specific transient response characteristics of the motor vehicle which are linearized.

In still another aspect of the present disclosure the method for managing chassis and driveline actuators of a motor vehicle further includes generating the optimal control action generated further includes generating a control signal to the one or more actuators of the motor vehicle that achieves increases motor vehicle stability, handling, maneuverability, and steerability from a first level to a second level greater than the first level for a driver input and vehicle state information at a given point in time.

In still another aspect of the present disclosure the method for managing chassis and driveline actuators of a motor vehicle further includes generating the optimal control action further includes generating a modified driver desired dynamic output control signal to the one or more actuators of the motor vehicle that increases motor vehicle performance from a first level to a second level greater than the first level, and reducing or substantially eliminating control interventions from control systems including: a traction control system (TCS) input, a stability control system input, an antilock braking system (ABS) input.

In still another aspect of the present disclosure a method for managing chassis and driveline actuators of a motor vehicle includes processing a driver input through a control module having a processor, a memory, and input/output (I/O) ports, the processor executing program code portions stored in the memory. The program code portions obtain static and dynamic vehicle state information from one or more sensors equipped to the motor vehicle, the one or more sensors measuring orientation of the motor vehicle with inertial measurement units (IMUs) capable of measuring orientation, acceleration, and velocity in three or more degrees of freedom, and measure orientation of motor vehicle suspension componentry with Semi Active Damping Suspension (SADS) sensors capable of measuring orientation, position, velocity, acceleration in both linear and rotational aspects. The program code portions measure a physical location of the motor vehicle with global positioning system (GPS) sensors, and measure motor vehicle wheel speed using wheel speed sensors. The program code portions further measure a throttle position of the motor vehicle with throttle position sensors, measure an accelerator pedal position with accelerator position sensors, measure steering movement with steering position sensors, and measure tire information with tire pressure monitoring sensors. The program code portions also receive the driver input including receiving a torque request from the driver, and receiving a steering input from the driver. Based on measurements the one or more sensors and an estimation of capacities of the one or more actuators, the program code portions convert the torque request and the steering input from the driver into a desired dynamic output that approximates vehicle dynamics that the driver input indicates. The program code portions further estimate actions of one or more actuators equipped to the motor vehicle based on the vehicle state information, and estimating capacities of the one or more actuators based on the vehicle state information and predetermined actuator capacity ranges, the one or more actuators altering static and dynamic characteristics of the motor vehicle. The program code portions further generate one or more control action constraints from the vehicle state information and the estimation of capacities of the one or more actuators such that the control action constraints limit control signals to the one or more actuators to control signals possible within physical limitations or capacities of the actuators and so that the control signals fall within grip capacity of tires of the motor vehicle. The program code portions further generate one or more control action constraints from the vehicle state information and the estimation of capacities of the one or more actuators such that the control action constraints limit control signals to the one or more actuators to control signals possible within physical limitations or capacities of the actuators and so that the control signals fall within grip capacity of tires of the motor vehicle. The program code portions further generate a reference control action including: generating an output command to one or more electronic limited slip differential (eLSD) actuators, generating an output command to one or more electronic all-wheel-drive (eAWD) actuators, and generating an output command to one or more active aerodynamic actuators. The output commands to the one or more eLSD, eAWD, and active aerodynamic actuators are calculated to achieve specific transient response characteristics of the motor vehicle which are linearized. The program code portions integrate the vehicle state information, the estimated actions of the one or more actuators, the desired dynamic output, the reference control action and the control action constraints and generating an optimal control action based thereon. The optimal control action defines a modified driver desired dynamic output control signal to the one or more actuators of the motor vehicle that falls within a range of predefined actuator capacities and maximizes driver control of the vehicle in complex driving scenarios.

In still another aspect of the present disclosure obtaining vehicle state information further includes measuring a lateral velocity of the motor vehicle, measuring a longitudinal velocity of the motor vehicle, measuring a yaw rate of the motor vehicle, measuring wheel angular velocity of the wheels of the motor vehicle, and measuring longitudinal, lateral, and normal forces on each tire of the motor vehicle. Generating an optimal control action further includes generating a control signal to the one or more actuators of the motor vehicle that achieves increases motor vehicle stability, handling, maneuverability, and steerability from a first level to a second level greater than the first level for a driver input and vehicle state information at a given point in time.

Generating the optimal control action further includes generating a modified driver desired dynamic output control signal to the one or more actuators of the motor vehicle that increases motor vehicle performance from a first level to a second level greater than the first level, and reducing or substantially eliminating control interventions from control systems including: a traction control system (TCS) input, a stability control system input, an antilock braking system (ABS) input.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
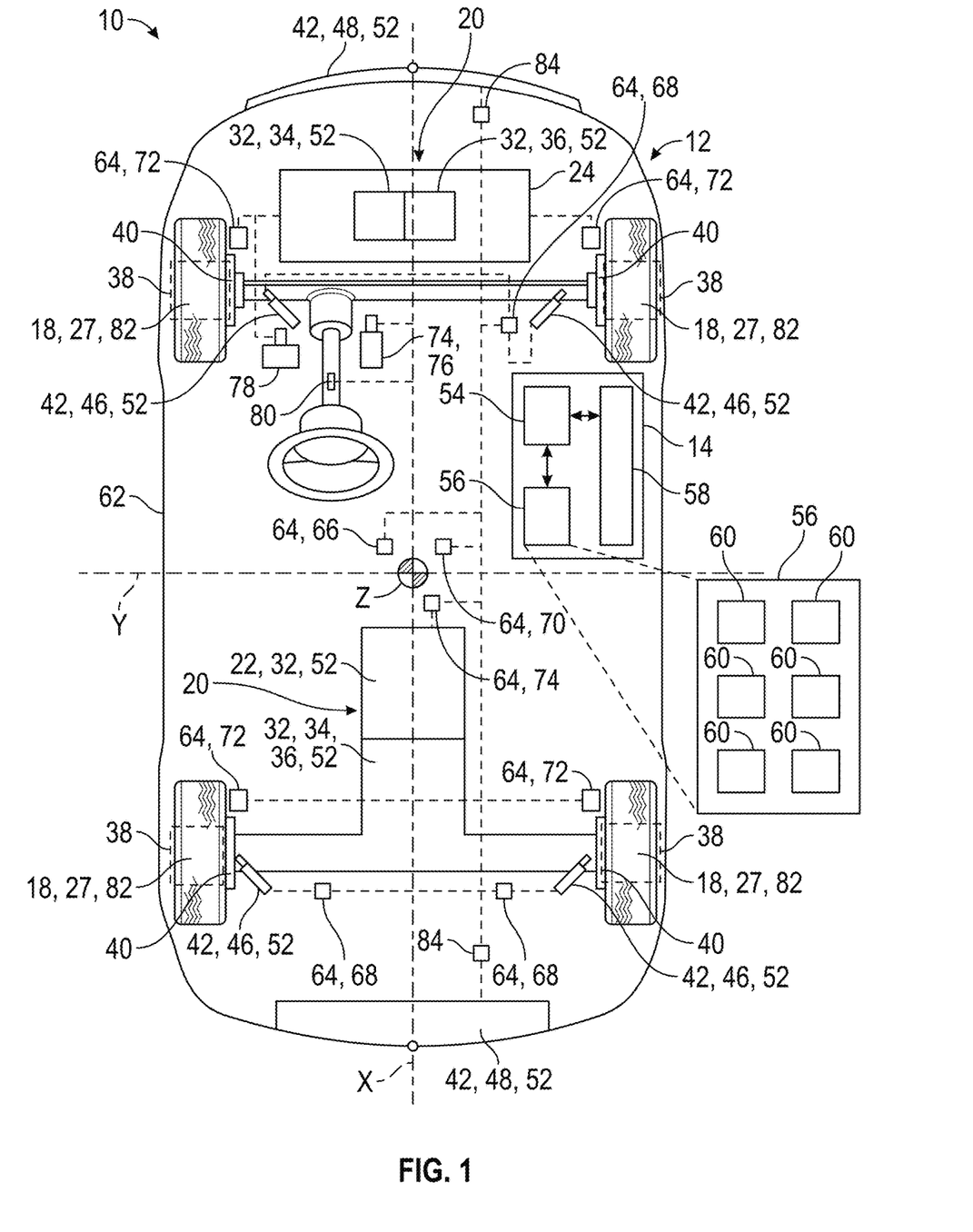
FIG. 1 is a schematic diagram of a motor vehicle having an architecture and method for model predictive control based methodology to manage chassis and driveline actuators according to an according to an aspect of the present disclosure.

Referring to FIG. 1, a system 10 for model-predictive control (MPC) based management of chassis and driveline actuators for a motor vehicle 12 is shown. The system 10 includes the motor vehicle 12 and one or more controllers 14. The motor vehicle 12 is shown as a car, but it should be appreciated that the motor vehicle 12 may be a van, bus, tractor-trailer, semi, Sport-Utility Vehicle (SUV), all-terrain vehicle (ATV), truck, tricycle, motorcycle, airplane, amphibious vehicle, or any other such vehicle which makes contact with the ground without departing from the scope or intent of the present disclosure. The motor vehicle 12 includes one or more wheels having tires 18 and a drivetrain 20. The drivetrain may include a variety of components such as internal combustion engines (ICE) 22 and/or electric motors 24, and transmissions 26 capable of transmitting motive power developed by the ICEs 22 and/or electric motors 24 to the wheels 27, and ultimately to the tires 18 affixed thereto. In one example, the motor vehicle 12 may include an ICE 22 acting on a rear axle 28 of the motor vehicle 12 as well as one or more electric motors 24 acting on a front axle 30 of the motor vehicle 12. It should be appreciated, however, that the motor vehicle 12 may use one or more ICEs 22, and/or one or more electric motors 24 disposed in other configurations without departing from the scope or intent of the present disclosure. For example, the motor vehicle 12 may have an ICE 22 acting only on the front axle 30, while one or more electric motors 24 acts solely on the rear axle 28. In further examples, the ICE 22 may act on both front and rear axles 30, 28, and an electric motor may act on both front and rear axles 30, 28.

In several aspects, the drivetrain 20 includes one or more in-plane actuators 32. In-plane actuators 32 may include all-wheel drive (AWD) systems including electronically-controlled or electric AWD (eAWD) 34 systems as well as limited slip differentials (LSDs) including electronically-controlled or electric LSD (eLSD) 36 systems. In-plane actuators 32 including eAWD 34 and eLSD 36 systems can generate and/or modify force generation in X and/or Y directions at a tire 18 to road surface contact patch 38 within a certain predetermined capacity. An eAWD 34 system may transfer torque from front to rear of a motor vehicle 12 and/or from side-to-side of the motor vehicle 12. Likewise, an eLSD 36 system may transfer torque from side-to-side of the motor vehicle 12. In some examples, the eAWD 34 and/or eLSD 36 may directly alter or manage torque delivery from the ICE 22 and/or electric motors 24 and/or the eAWD 34 and eLSD 36 may act on a braking system 40 to adjust a quantity of torque delivered to each of the tires 18 of the motor vehicle 12.

In further examples, the motor vehicle 12 may include a means of altering a normal force on each of the tires 18 of the motor vehicle 12 via one or more out-of-plane actuators 42 such as active aerodynamic actuators 44 and/or active suspension actuators 46. The active aerodynamic actuators 44 may actively or passively alter an aerodynamic profile of the motor vehicle via one or more active aerodynamic elements 48 such as wings, spoilers, fans or other suction devices, actively-managed Venturi tunnels, and the like. The active suspension actuators 46 such as active dampers 50 or the like. In several aspects, the active dampers 50 may be magnetorheological dampers or other such electrically, hydraulically, or pneumatically-adjustable dampers without departing from the scope or intent of the present disclosure. For the sake of simplicity in the description that follows, ICEs 22, electric motors 24, eAWD 34, eLSD 36, the braking system 40, aerodynamic control system, active aerodynamic elements 48, active dampers 46, and the like will be referred to more broadly as actuators 52.

The terms "forward", "rear", "inner", "inwardly", "outer", "outwardly", "above", and "below" are terms used relative to the orientation of the motor vehicle 12 as shown in the drawings of the present application. Thus, "forward" refers to a direction toward a front of a motor vehicle 12, "rearward" refers to a direction toward a rear of a motor vehicle 12. "Left" refers to a direction towards a left-hand side of the motor vehicle 12 relative to the front of the motor vehicle 12. Similarly, "right" refers to a direction towards a right-hand side of the motor vehicle 12 relative to the front of the motor vehicle 12. "Inner" and "inwardly" refers to a direction towards the interior of a motor vehicle 12, and "outer" and "outwardly" refers to a direction towards the exterior of a motor vehicle 12, "below" refers to a direction towards the bottom of the motor vehicle 12, and "above" refers to a direction towards a top of the motor vehicle 12. Further, the terms "top", "overtop", "bottom", "side" and "above" are terms used relative to the orientation of the actuators 52, and the motor vehicle 12 more broadly shown in the drawings of the present application. Thus, while the orientation of actuators 52, or motor vehicle 12 may change with respect to a given use, these terms are intended to still apply relative to the orientation of the components of the system 10 and motor vehicle 12 components shown in the drawings.

The controllers 14 are non-generalized, electronic control devices having a preprogrammed digital computer or processor 54, non-transitory computer readable medium or memory 56 used to store data such as control logic, software applications, instructions, computer code, data, lookup tables, etc., and input/output (I/O) ports 58. Computer readable medium or memory 56 includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 56 excludes wired, wireless, optical, or other communication links that transport transitory electrical or other signals. A non-transitory computer readable memory 56 includes media where data can be permanently stored and media where data can be stored and later overwritten, such as a rewritable optical disc or an erasable memory device. Computer code includes any type of program code, including source code, object code, and executable code. The processor 54 is configured to execute the code or instructions. The motor vehicle 12 may have controllers 14 including a dedicated Wi-Fi controller or an engine control module, a transmission control module, a body control module, an infotainment control module, etc. The I/O ports 58 may be configured to communicate via wired communications, wirelessly via Wi-Fi protocols under IEEE 802.11x, or the like without departing from the scope or intent of the present disclosure.

The controller 14 further includes one or more applications 60. An application 60 is a software program configured to perform a specific function or set of functions. The application 60 may include one or more computer programs, software components, sets of instructions, procedures, functions, objects, classes, instances, related data, or a portion thereof adapted for implementation in a suitable computer readable program code. The applications 60 may be stored within the memory 56 or in additional or separate memory. Examples of the applications 60 include audio or video streaming services, games, browsers, social media, etc. In other examples, the applications 60 are used to manage body control system functions, suspension control system functions, aerodynamic control system functions, or the like in an exemplary motor vehicle 12.

Figure 2:
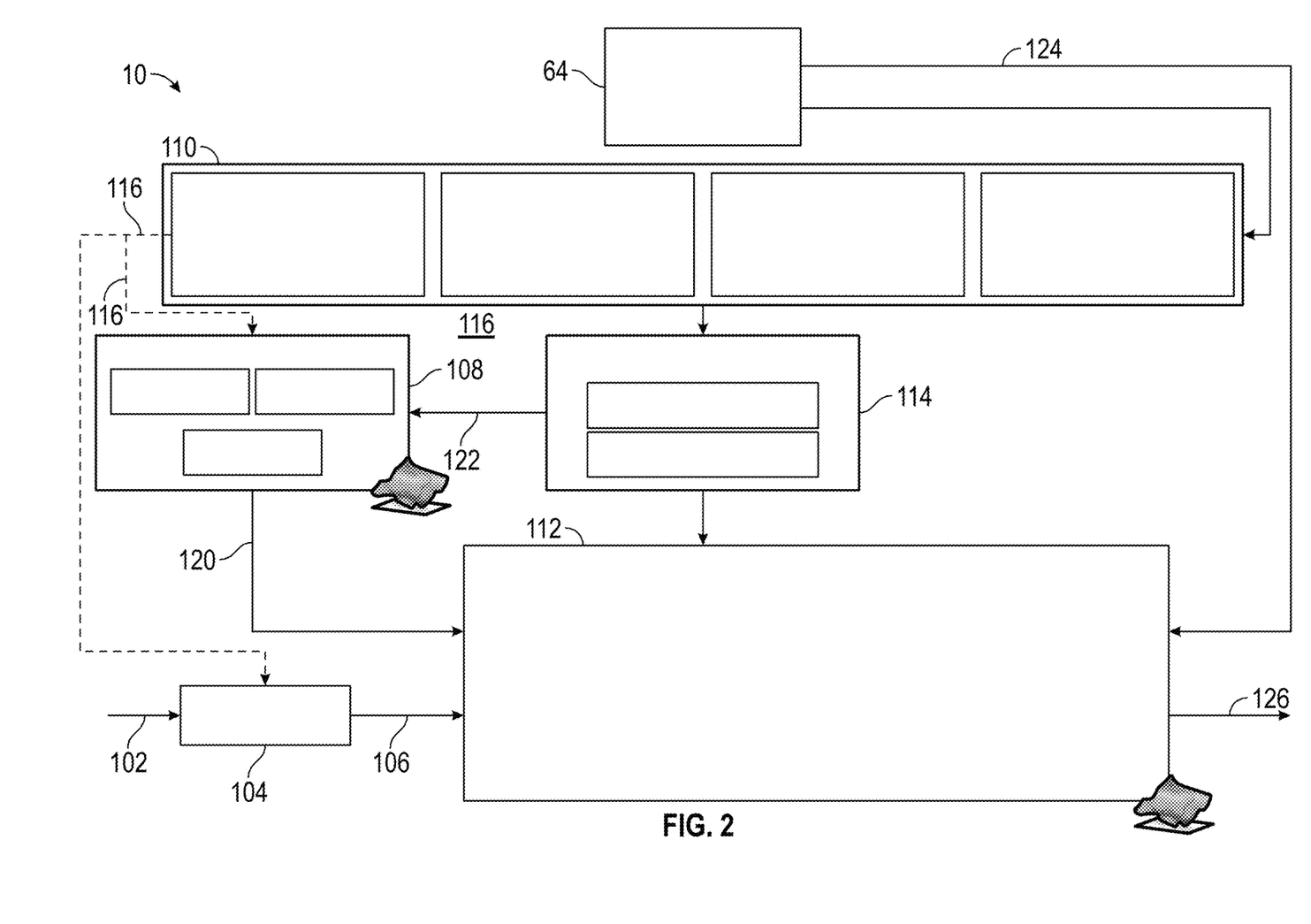
FIG. 2 is a block diagram of the system and method for model predictive control based management of chassis and driveline actuators of a motor vehicle of FIG. 1 according to an aspect of the present disclosure.

Referring now to FIG. 2 and with continuing reference to FIG. 1, the system 10 utilizes one or more applications 60, stored in memory 56, for managing chassis and driveline actuators 52 of the motor vehicle 12. In several aspects, the applications 60 include computer control code portions that coordinate actuators 52 to redistribute tire 18 forces in axle and/or wheel 27 level, and/or to adjust tire 18 capacity to allow increased force generation at the tire 18/road surface contact patch 38. The computer control code portions operate using a physics-based technique that models each actuator's 52 functionality as well as the actuator's 52 impact on motor vehicle motion 12 through body 62 and wheel 27 dynamics, as well as through combined tire 18 slip models. The combined tire 18 slip model computes normalized longitudinal and lateral forces in tire 18/road surface contact patch 38 due to tire 18 deformation and characteristics.

Subsequently, based on available vertical force, tire 18 forces are calculated in longitudinal and lateral directions, and interconnected to wheel 27 and body 62 dynamics to comprehend the impact of the adjusted forces on motor vehicle 12 dynamics.

More specifically, at block 100, the system 10 receives a driver input 102 to a driver control interpreter (DCI) 104. The DCI 104 reads a variety of driver inputs such as steering input, throttle input, braking input, or the like, and interprets the driver inputs before generating a desired dynamics signal 106 in the form of an actuator output. In several aspects, the DCI 104 determines boundaries for optimization and optimal coordination of actuators 52. In complex driving scenarios at or near the limits of tire 18 adhesion, the driver's inputs may exceed predefined actuator 52 capacities, tire 18 capacities, and the like. Accordingly, the system 10 utilizes a constrained optimization to reallocate sufficient capacity to X and Y directions in real-time and to redistribute tire 18 forces within the functionality and hardware limitations of each of the actuators 52. Out-of-plane actuators 42 can modify normal forces and alter force generation in X and/or Y directions at a tire 18 adhesion limit. The constrained optimization examines whether the current tire 18 capacity is sufficient with actuator 52 functionality and hardware limitations to redistribute tire 18 forces to achieve desired motor vehicle 12 motion using eAWD 34 and/or eLSD 36, or where tire 18 capacity must be increased via active aerodynamic actuators 44 if increased traction or lateral grip is requested by a driver of the motor vehicle 12. The constrained optimization is solved in a real-time fashion to optimally harmonize control commands from different actuators 52 so that motor vehicle 12 performance capabilities are maximized and so that control interventions are minimized. That is, the motor vehicle 12 performance capabilities are increased from a first level to a second level greater than the first level so that control interventions, such as: a traction control system (TCS) input, a stability control system input, an antilock braking system (ABS) input, or the like are reduced or substantially eliminated.

The system 10 includes several control devices, one or more of which may be integrated into a single controller 14, or may be integrated into distinct, separate controllers 14 in electronic communication with one another. The controllers 14 include a feed-forward controller 108 which commands the actuators 52 to achieve certain transient response characteristics, provide optimal reference control actions, and linearize control responses around an operation point. More specifically, the feed-forward controller 108 provides active aerodynamic preemptive control signals, eLSD 36 preemptive control signals, and eAWD 34 preemptive control signals. Preemptive control signals, adjust actuator 52 outputs to comport with control signal estimates from a sensor/estimation module 110.

The sensor/estimation module 110 provides information to the optimization-based feed-forward controller 108 and feedback controller 112. In several aspects, the sensor/estimation module 110 generates estimations 116 for each of the various active chassis and dynamics systems equipped to the motor vehicle 12. In a particular example, the sensor/estimation module 110 includes an aero model estimation, an eLSD 36 model estimation, an eAWD 34 model estimation, and vehicle dynamics estimations 116. The aero model estimation calculates downforce and maximum downforce possible given current vehicle state information. Likewise, the eLSD 36 model estimation includes clutch torque estimations and maximum clutch torque capacity estimations. The eAWD 34 model estimation produces maximum electric motor 24 torque estimations. Finally, the vehicle dynamics estimations 116 include vehicle states, road surface information, tire 18 force calculations, and road angles.

A dynamic constraint calculator 114 applies actual physical limitations, and tire 18 and road grip limitations to signals from the sensor/estimation module 110.

Finally, the feedback controller 112 operates to achieve maximum feasible performance, stability, handling, maneuverability, steerability of the motor vehicle 12 in utilizing in-plane and out-of-plane actuators 32, 42. The feedback controller 112 receives a desired motor vehicle 12 dynamics signal 106 from the DCI 104, a reference control action 120 from the feed-forward controller 108, control action constraints 122 from the dynamic constraint calculator 114, and measurements 124 from the various sensors 64 equipped to the motor vehicle 12. The feedback controller 112 then integrates the desired dynamics signal 106, reference control action 120, control action constraints 122, and measurements 124 into a model which accounts for body 62 and wheel 27 dynamics and in-plane and out-of-plane actuators 32, 42. The feedback controller 112 models electric motor 24 torque, eLSD 36 outputs, eAWD 34 outputs, combined tire 18 slip data, and active aerodynamic actuator 44 outputs, as well as front-to-rear and/or side-to-side interactions of various actuators 52 of the motor vehicle.

In addition, a model predictive control (MPC) approach is used in the feedback controller 112. The feedback controller 112 receives a variety of motor vehicle 12 state variables from sensors 64 equipped to the motor vehicle 12. The sensors 64 may measure and record a wide variety of motor vehicle 12 data. In several examples, the sensors 64 may include inertial measurement units (IMUs) 66, suspension control units such as Semi Active Damping Suspension (SADS) 68, global positioning system (GPS) sensors 70, wheel speed sensors 72, throttle position sensors 74, accelerator pedal position sensors 76, brake pedal position sensors 78, steering position sensors 80, tire pressure monitoring sensors 82, aerodynamic element position sensors 84, and the like. The IMUs 66 can measure movement, acceleration, and the like in several degrees of freedom. In a specific example, the IMUs 66 may measure position, movement, acceleration, etc. in at least three degrees of freedom. Likewise, the SADS 68 sensors may be IMUs 66 capable of measuring in three or more degrees of freedom. In some examples, the SADS 68 may be suspension hub accelerometers, or the like. Accordingly, the motor vehicle 12 state variables may include any of a wide variety of data including but not limited to: wheel 27 speed data, SADS and IMU data including attitude, acceleration and the like.

The MPC control logic portion or algorithm in the feedback controller 112 produces state predictions based on initial state variables measured or estimated by the sensors 64 on the motor vehicle 12. Additional estimations 116 may also be made in order to model the impact of different factors on state variables. In cases of nonlinearity in the prediction model, a linearized model is provided for specific operational parameters using motor vehicle 12 state variable measurements and/or estimations 116 and reference control actions 120. In order to come up with feasible control commands for the various actuators 52, actuator 52 capacity and tire 18 capacity limits should be taken into consideration in calculations. That is, a given actuator 52 in the motor vehicle 12 may have a limited range of outputs including but not limited to a limited range of motion, limitations on velocity and/or acceleration, actuator 52 torque, and the like. Similarly, tire 18 capacity may be limited by tread depth, tire 18 wear, tire 18 pressure, tire 18 compound, tire 18 temperature, a coefficient of friction of a road surface at the contact patch 38, and the like. Accordingly, the feedback control portion of the MPC in the feedback controller 112 includes an offline control logic portion that contains a formulation of the state variables of the motor vehicle 12 as well as a control objective design, as well as an online optimization control logic portion.

A prediction model control logic portion forecasts the evolution of state variables (X) and evaluates a connection between a control action sequence (U) and outputs (Y) over a finite prediction horizon. The prediction model control logic portion includes motor vehicle core dynamics such as a body 62 dynamics model including longitudinal, lateral, yaw, bounce, and pitch characteristics of the motor vehicle 12. Likewise, the prediction model control logic includes a wheel 27 dynamics model that including angular speed and relative speed data, as well as longitudinal slip and slip ratio characteristics of each wheel 27. The prediction model control logic also includes a tire 18 mechanics model that contains a combined slip tire model for each tire 18 of the motor vehicle 12. Finally, the prediction model control logic includes an actuator 52 model that contains actuator 52 dynamics, constraints, and functionality.

Figure 3:
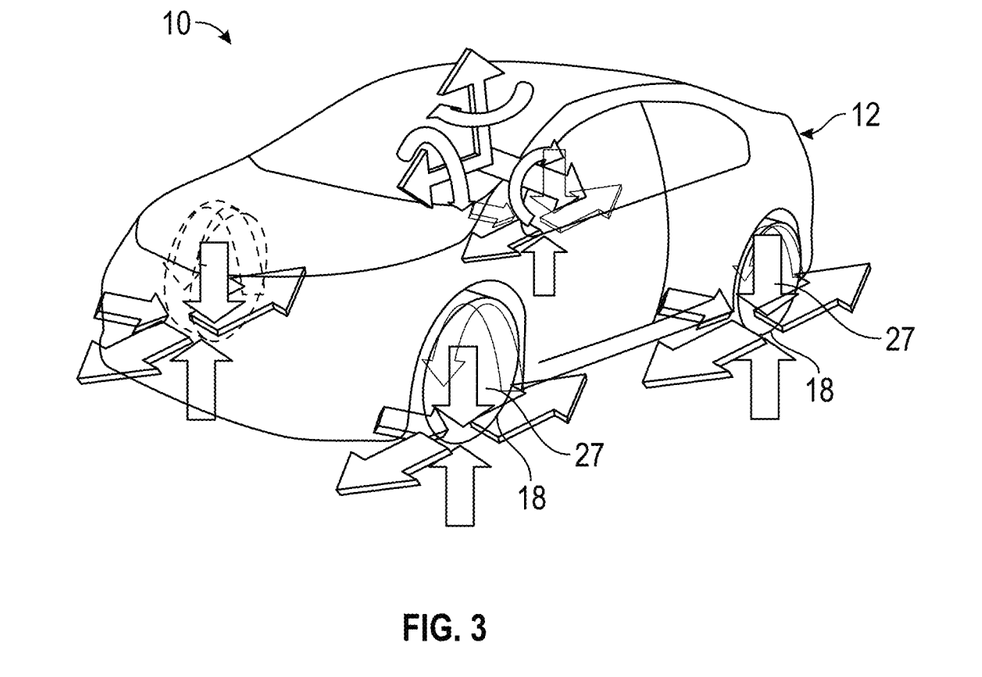
FIG. 3 is a perspective side view of actual motions and control actions of a motor vehicle utilizing the system and method for model predictive control based management of chassis and driveline actuators according to an aspect of the present disclosure.

Referring now to FIG. 3, and with continuing reference to FIGS. 1 and 2, a diagram of body 62 dynamics is shown. Planar body 62 dynamics of the motor vehicle can be calculated according to the following equations:

$$\dot{v}_x = ((F_{x_1} + F_{x_2})\cos\delta_f - (F_{y_1} + F_{y_2})\sin\delta_f)/m +$$
$$((F_{x_3} + F_{x_4})\cos\delta_r - (F_{y_3} + F_{y_4})\sin\delta_r/m + rv_y$$
$$\dot{v}_y = ((F_{x_1} + F_{x_2})\sin\delta_f + (F_{y_1} + F_{y_2})\cos\delta_f)/m +$$
$$((F_{x_3} + F_{x_4})\sin\delta_r + (F_{y_3} + F_{y_4})\cos\delta_r)/m - rv_x$$
$$\ddot{\psi} = (L_f(F_{y_1} + F_{y_2}) + L_{w_f}(F_{x_2} - F_{x_1}))\cos\delta_f/I_{zz} +$$
$$(L_f(F_{x_1} + F_{x_2}) + L_{w_f}(F_{y_2} - F_{y_1}))\sin\delta_f/I_{zz} -$$
$$(L_r(F_{y_3} + F_{y_4}) + L_{w_r}(F_{x_4} - F_{x_3}))\cos\delta_f/I_{zz} -$$
$$(L_r(F_{x_3} + F_{x_4}) + L_{w_r}(F_{y_4} - F_{y_4}))\sin\delta_f/I_{zz}$$

Similarly, the wheel 27 dynamics model is formulated based on angular velocity or slip ratio as:

$$\dot{\omega}_i = (T_i - T_{b_i} - R_{e_i}F_{x_i})/J_{w_i}$$

$$\dot{k}_i = R_{e_i}(T_i - T_{b_i} - R_{e_i}F_{x_i})/J_{w_i}v_{x,w_i} - \dot{v}_{x,w_i}/v_{x,w_i}(1+k_i)$$

i=1,2, . . . ,4.

The combined slip tire 18 model used herein may be based on a so-called "magic formula" (MF) based tire 18 model, however, it should be appreciated that any tire 18 model that can properly represent nonlinear and combined slip behavior of tires 18 may be used instead, or in combination with the MF tire 18 model without departing from the scope or intent of the present disclosure. The MF tire 18 model fits a wide variety of tire 18 types, constructions, and operating conditions. In the MF tire model, each tire 18 is characterized by a plurality of coefficients for each force relevant to tire 18 performance. In some examples, the plurality of coefficients relate to contact patch, lateral and longitudinal forces, self-aligning torque, and the like. These coefficients are used as a best-fit between experimentally-determined tire 18 performance data and the MF model. The coefficients then may be used to generate equations showing how much force is generated for a particular vertical load on the tire 18, as well as camber angle, slip angle and the like. In an example, the MF based tire 18 model may be presented as follows for a longitudinal force $F_x$:

$$F_x = (D_x \sin[C_x \tan^{-1}(B_x k_x - E_x(B_x k_x - \tan^{-1}(B_x k_x)))] + S_{V_x})G_{xa}$$

In a pure slip condition, i.e. one in which the tires 18 of the motor vehicle 12 are sliding with relation to the contact patch 38, the following formulae apply:

$$\kappa_x = \kappa + S_{Hx}$$
$$C_x = p_{C_{x1}}\lambda_{Cx}$$
$$D_x = \mu_x F_z \xi_1$$
$$\mu_x = (p_{Dx1} + p_{Dx2}df_z)(1 + p_{px3}dpi + p_{px4}dpi^2)(1 - p_{Dx3}\gamma^2)\lambda_{\mu_x}$$
$$E_x = (P_{Ex1} + P_{Ex2}df_z + p_{Ex3}df_z^2)(1 - p_{Ex4}\text{sgn}(\kappa_x))\lambda_{E_x}$$
$$K_{x\kappa} = F_z(p_{Kx1} + p_{Kx2}df_z)e^{p_{Kx3}df_z}(1 + p_{px1}dpi + p_{px2}dpi^2)\lambda_{K_{x\kappa}}$$
$$B_x = \frac{K_{x\kappa}}{C_x D_x}$$
$$S_{Hx} = (p_{Hx1} + p_{Hx2}df_z)\lambda_{H_x}$$
$$S_{V_x} = F_z(p_{V_{x1}} + p_{V_{x2}}df_z)\lambda_{V_x}\lambda_{\mu_x}\xi_1$$

A combined slip tire 18 model may therefore be represented as:

$$G_{xa} = \frac{\cos[C_{xa}\tan^{-1}\{B_{xa}\alpha_s - E_{xa}(B_{xa}\alpha_s - \tan^{-1}(B_{xa}\alpha_s))\}]}{\cos[C_{xa}\tan^{-1}\{B_{xa}S_{Hxa} - E_{xa}(B_{xa}S_{Hxa} - \tan^{-1}(B_{xa}S_{Hxa}))\}]}$$

$$\alpha_s = \alpha_F + S_{Hxa}$$
$$B_{xa} = (r_{Bx1} + r_{Bx3}\gamma^2)\cos\{\tan^{-1}[r_{Bx2}\kappa]\}\lambda_{x_a}$$
$$C_{xa} = r_{Cx1}$$
$$E_{xa} = r_{Ex1} + r_{Ex2}df_z$$
$$S_{Hxa} = r_{Hx1}$$

However, when combined slip in longitudinal and lateral directions is not used, $G_{xa}=1$. Similarly, when turning-slip is not used in the formulae above, $\xi_1=1$.

The lateral force $F_y$ may also be calculated using a MF based tire 18 model in accordance with the following simplified MF equation.

$$F_y = G_{yk}F_{yp} + S_{V_{yk}}$$

In a pure slip condition, the following modified MF based tire 18 model equations may be used:

$$F_{yp} = D_y\sin[C_y\tan^{-1}\{B_y a_y - E_y(B_y\alpha_y - \tan^{-1}(B_y\alpha_y))\} +$$
$$C_\gamma\tan^{-1}\{B_\gamma\gamma - E_\gamma(B_\gamma\gamma - \tan^{-1}(B_\gamma\gamma))\}] + S_{V_y}$$
$$\alpha_y = \alpha_F + S_{Hy}$$
$$C_y = p_{Cy1}\lambda_{Cy}$$
$$C_\gamma = p_{Cy2}\lambda_{Cy}$$
$$D_y = \mu_y F_z$$
$$\mu_y = p_{Dy1}e^{p_{Dy2}df_z}(1 + p_{py3}dpi + p_{py4}dpi^2)\lambda_{\mu y}(1 - p_{Dy3}\gamma^2)$$
$$K_{ya} = p_{Ky1}F_{z0}(1 + p_{py1}dpi)$$

-continued $$\sin\left[p_{Ky2}\tan^{-1}\left\{\frac{F_z}{(p_{Ky3}+p_{Ky4}\gamma^2)F_{z0}(1+p_{py2}dpi)}\right\}\right](1-p_{Ky5}\gamma^2)\lambda_{Kya}\xi_3$$

$$K_{ya0} = p_{Ky1}F_{z0}(1+p_{py1}dpi)\sin\left[p_{Ky2}\tan^{-1}\left\{\frac{F_z}{p_{Ky3}F_{z0}(1+p_{py2}dpi)}\right\}\right]\lambda_{Kya}$$

$$K_{y\gamma0} = (p_{Ky6}+p_{Ky7}df_z)F_z\lambda_{Ky\gamma}(1+p_{py5}dpi)$$

$$B_y = \frac{K_{ya}}{C_yD_y},\ B_\gamma = \frac{K_{y\gamma0}}{C_\gamma D_y}$$

$$E_y = \{p_{Ey1}+p_{Ey2}\gamma^2+(p_{Ey3}+p_{Ey4}\gamma)\mathrm{sgn}(\alpha_y)\}\lambda_{Ey}$$

$$E_\gamma = p_{Ey5}\lambda_{Ey}$$

$$S_{Hy} = (p_{Hy1}+p_{Hy2}df_z)\lambda_{Hy}$$

$$S_{Vy} = F_z(p_{Vy1}+p_{Vy2}df_z)\lambda_{Vy}\lambda_{\mu y}\xi_2$$

$$S_{Vy\gamma} = F_z(p_{Vy3}+p_{Vy4}df_Z)\gamma\lambda_{Ky\gamma}\lambda_{\mu y}\xi_2$$

In a combined slip condition, the following modified MF based tire 18 model equations may be used:

$$D_{Vyk}=\mu_y F_z(r_{Vy1}+r_{Vy2}df_z+r_{Vy3}y)\cos(\tan^{-1}(r_{Vy4}\alpha_F))\xi_2$$

$$S_{Vyk}=D_{Vyk}\sin(r_{Vy5}\tan^{-1}(r_{Vy6}k))\lambda_{Vyk}$$

Weighting Function:

$$G_{yk} = \frac{\cos[C_{yk}\tan^{-1}\{B_{yk}\kappa_s - E_{yk}(B_{yk}\kappa_s - \tan^{-1}(B_{yk}\kappa_s))\}]}{\cos[C_{yk}\tan^{-1}\{B_{yk}S_{Hyk} - E_{yk}(B_{yk}S_{Hyk} - \tan^{-1}(B_{yk}S_{Hyk}))\}]}$$

$$\kappa_s = \kappa + S_{Hyk}$$

$$B_{yk} = (r_{By1}+r_{By2}\gamma^2)\cos\{\tan^{-1}[r_{By2}(\alpha_F - r_{By3})]\}\lambda_{yk}$$

$$C_{yk} = r_{Cy1},\ E_{yk} = r_{Ey1}+r_{Ey2}df_z,\ S_{Hyk} = r_{Hy1}+r_{Hy2}df_z$$

When combined slip is not used: $S_{Vyk}=0$, $G_{yk}=1$. When turn slip is not used: $\xi_i=1$, $i=1{:}4$.

Figure 4:
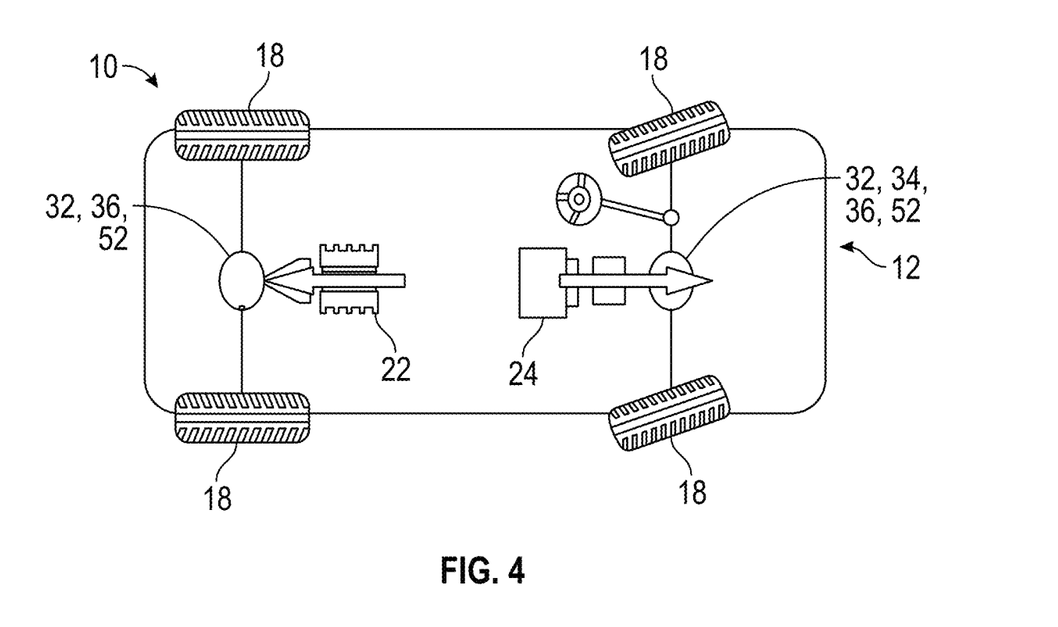
FIG. 4 is a schematic diagram of a drivetrain of a motor vehicle using an architecture and method for model predictive control based methodology to manage chassis and driveline actuators of FIG. 1 according to an aspect of the present disclosure.

Referring now to FIG. 4, and with continuing reference to FIGS. 1-3, torque dynamics in both front and rear axles 30, 28 may be characterized by:

$$\dot{T}_{1,2} = -\frac{1}{\tau_f}T_{1,2} + \frac{1}{2\tau_f}T_{frqst}$$

$$\dot{T}_3 = \frac{-T_{ract}+T_{rrqst}}{2\tau_r} = \frac{-(T_3+T_4)+T_{rrqst}}{2\tau_r}$$

$$\dot{T}_4 = \frac{-T_{ract}+T_{rrqst}}{2\tau_r} = \frac{-(T_3+T_4)+T_{rrqst}}{2\tau_r}$$

where, $\tau_f$, $\tau_r$, are front and rear axles actuators time delay, respectively. In some aspects, a clutch-based torque front and rear axle 30, 28 torque distribution or dynamics solution plus eLSD 36 or torque-vectoring from wheel 27 to wheel 27 may be modeled by the following:

$$\dot{T}_{1,2} = -\frac{1}{\tau_f}T_{1,2} + \frac{1}{2\tau_f}T_{frqst}$$

$$\dot{T}_3 = -\frac{1}{2\tau_r}(T_3+T_4) - \frac{1}{2\tau_c}(T_3-T_4) + \frac{1}{2\tau_r}T_{rrqst} + \frac{1}{2\tau_c}p_1\tanh p_2(\Delta\omega)^{p_3}T_{crqst}$$

$$\dot{T}_4 = -\frac{1}{2\tau_r}(T_3+T_4) + \frac{1}{2\tau_c}(T_3-T_4) + \frac{1}{2\tau_r}T_{rrqst} - \frac{1}{2\tau_c}p_1\tanh p_2(\Delta\omega)^{p_3}T_{crqst}$$

where, $\tau_f$, $\tau_r$, $\tau_c$ are front and rear axles and clutch time delays, respectively. Similarly, in a motor vehicle 12 equipped with active aerodynamic actuators 44, active aerodynamics downforce dynamics may be modeled by:

$$\dot{v}_z = F_{sp}{}^f + F_{AntiDive}) + (F_{sp}{}^r + F_{Antisuqat}) - F_{z_{aero}}{}^f - F_{z_{aero}}{}^r)/m - g$$

$$\ddot{\theta} = (L_f(F_s{}^f + F_{AntiDive}) - L_r(F_s{}^r + F_{Antisquat}) - L_f{}^{DF}F_{z_{aero}}{}^f + L_r{}^{DF}F_{z_{aero}}{}^r - mha_x)/I_\theta$$

where, $$F_{sp}{}^f = F_{f_o} + K_f\Delta z_f + C_f\Delta\dot{z}_f F_{sp}{}^r = F_{r_o} + K_r\Delta z_r + C_r\Delta\dot{z}_r$$

where $F_{Anti\ Dive}$ and $F_{Anti\ Squat}$ are the portion of load transfer that is transferred to wheels through anti-dive and anti-squat mechanism, and $F_{sp}{}^f$ and $F_{sp}{}^r$ are front and rear spring forces.

$$F_{z_{aero}}^f = \frac{1}{2}\rho A^f v_x^2 C_L(\theta_w^f, h_w^f),$$

$$F_{z_{aero}}^r = \frac{1}{2}\rho A^r v_x^2 C_L(\theta_w^r, h_w^r)$$

$$\dot{F}_{z_{aero}}^f = \frac{1}{2}\rho A^f v_x^2\left(\frac{\partial C_L(\theta_w^f, h_w^f)}{\partial \theta_w^f}\dot{\theta}_w^{f,req} + \frac{\partial C_L(\theta_w^f, h_w^f)}{\partial h_w^f}\dot{h}_w^f\right)$$

$$\dot{F}_{z_{aero}}^r = \frac{1}{2}\rho A^r v_x^2\left(\frac{\partial C_L(\theta_w^r, h_w^r)}{\partial \theta_w^r}\dot{\theta}_w^{r,req} + \frac{\partial C_L(\theta_w^r, h_w^r)}{\partial h_w^r}\dot{h}_w^r\right)$$

$$\dot{\theta}_w^f = -\frac{1}{\tau_w^f}\theta_w^f + \frac{1}{\tau_w^f}\theta_w^{f,req},$$

$$\dot{\theta}_w^r = -\frac{1}{\tau_w^r}\theta_w^r + \frac{1}{\tau_w^f}\theta_w^{r,req}$$

$$\dot{h}_w^f = v_z + L_f^{DF}\dot{\theta},$$

$$\dot{h}_w^r = v_z - L_r^{DF}\dot{\theta}$$

Finally, integrating the above calculations, a state-space model of the motor vehicle 12 may be shown as:

$$\dot{x}(t)=f(x(t),u(t))$$

$$y(t)=g(x(t),u(t))$$

Likewise a linear time-varying (LTV) model that approximates above equation can be computed as follows:

$$A=\partial f/\partial x,\ B=\partial f/\partial u,\ C=\partial g/\partial x,\ D=\partial g/\partial u$$

And can be presented as:

$$\dot{x}(t)=Ax(t)+Bu(t)+W(t)$$

$$y(t)=Cx(t)+Du(t)+V(t)$$

Where, state variables and control actions can be defined as:

$$x=\{v_x v_y v_z \dot{\psi}\dot{\theta} T_1{}^{req}T_2{}^{req}T_3{}^{req}T_4{}^{req}F_{z_{aero}}{}^f F_{z_{aero}}{}^f \theta_w{}^f \theta_w{}^f\}^T$$

$$u=\{T_f{}^{req}T_r{}^{req}T_c{}^{req}\theta_w{}^{f,req}\theta_w{}^{r,req}\}^T$$

In an example, the first component of the matrix A can be calculated as:

$$A = \begin{bmatrix} \partial f_1/\partial x_1 & \cdots & \partial f_1/\partial x_{11} \\ \vdots & \ddots & \vdots \\ \partial f_{11}/\partial x_1 & \cdots & \partial f_{11}/\partial x_{11} \end{bmatrix}_{11\times 11}$$

Similar matrix calculations can be carried out for each of the components of Matrices A, B, C and D. For examples $\partial f_1/\partial x_1$ can be written as:

$$\begin{pmatrix} +\cos(\delta_f)\sum_{i=1}^{4}\left(\frac{\partial F_{x_i}(\alpha_i, \kappa_i, F_{z_i})}{\partial \alpha_i} \times \frac{\partial \alpha_i}{\partial x_1} + \frac{\partial F_{x_i}(\alpha_i \kappa_i, F_{z_i})}{\partial \kappa_i} \times \frac{\partial \kappa_i}{\partial x_1} + \frac{\partial F_{x_i}(\alpha_i, \kappa_i, F_{z_i})}{\partial F_{z_i}} \times \frac{\partial F_{z_i}}{\partial x_1}\right) \\ -\sin(\delta_f)\sum_{i=1}^{4}\left(\frac{\partial F_{y_i}(\alpha_i, \kappa_i, F_{z_i})}{\partial \alpha_i} \times \frac{\partial \alpha_i}{\partial x_1} + \frac{\partial F_{y_i}(\alpha_i, \kappa_i, F_{z_i})}{\partial \kappa_i} \times \frac{\partial \kappa_i}{\partial x_1} + \frac{\partial F_{y_i}(\alpha_i, \kappa_i, F_{z_i})}{\partial F_{z_i}} \times \frac{\partial F_{z_i}}{\partial x_1}\right) \end{pmatrix}/m$$

The LTV portion of the MPC algorithm is designed to solve a constrained optimization problem at each sampling time with the following objectives and cost terms:

$$J(x(t), U) = \underbrace{\sum_{k=1}^{p}\left\|y_{t+k,t} - V_{x_{t+k,t}}^{Ref}\right\|_{W_1}^{2}}_{\text{motion error term}} + \underbrace{\sum_{k=0}^{p-1}\left\|u_{t+k,t} - u_{t+k,t}^{Ref}\right\|_{W_2}^{2}}_{\text{control action error}} +$$

$$\underbrace{\left\|\Delta u_{t+k,t} - \Delta u_{t+k,t}^{Ref}\right\|_{W_3}^{2}}_{\text{control action variation error}} + \underbrace{\left\|T_{f_{t+k,t}} + T_{rl_{t+k,t}} + T_{rr_{t+k,t}} - T_{driver_{t+k,t}}^{Ref}\right\|_{W_4}^{2}}_{\text{total torque error}}$$

s.t. $x_{t+k+1,t} = A(x_{t+k,t} - \bar{x}_t) + B(u_{t+k,t} - \bar{u}_t) + W, k = 0, \ldots, N-1$ $x_0 = x(t)$ $u_{min} \leq u_{t+k} \leq u_{max}, k = 0, \ldots, N-1$ $y_{min} \leq Cx_{t+k} \leq y_{max}, k = 1, \ldots, N$ where $y_{t+k,t}$ and $y_{t+k,t}^{Ref}$ denote predicted and reference longitudinal velocity, respectively, and where $u_{t+k,t}$ and $u_{t+k,t}^{Ref}$ denote control actions that includes, front, rear left and rear right torque distributions, respectively. Additionally, $\Delta u_{t+k,t}$ and $\Delta u_{t+k,t}^{Ref}$ denote control action variation and its reference, respectively. $T_{f_{t+k,t}}$, $T_{rl_{t+k,t}}$, $T_{rr_{t+k,t}}$ are front, rear left, and rear right torque distribution sequence and $T_{driver_{t+k,t}}^{Ref}$ is driver torque request. Utilizing the above equations and variables output can be shown as:

$$y = \{v_x, v_y, v_z, \dot{\theta}\dot{\psi}\alpha_x, \alpha_y, \alpha_z, M_\theta, M_\psi, \omega_1, \omega_2, \omega_3, \omega_4\}^T$$

where $\bar{x}_t$, $\bar{u}_t$ represent nominal operating point for state and command. A nominal state, $\bar{x}_t$, is calculated based on solving the nonlinear vehicle/wheel model and $\bar{u}_t$ is calculated outside MPC, for example, by feedforward control within the feed-forward controller 108.

Once the motor vehicle 12, tire 18, and actuator 52 modeling has been completed, and the cost function(s) and constraints described above have been determined, the controller 14 executes a control logic that functions as a quadratic problem (QP) solver that dynamically solves quadratic problems in real-time to optimize control signals to the actuators 52 of the motor vehicle 12 so as to achieve maximum grip, stability, and the like. Specifically, the above-described adaptive cost function is optimized in an online fashion to find feasible sets of control actions to actuators 52 which minimize any potential error. By substituting $$x_k = A^k x(t) + \sum_{i=0}^{k-1} A^i B u_{k-1-i}$$

in the cost function and recasting:

$$U^*(x(t)) \triangleq \arg\min_U \frac{1}{2} U'HU + x'(t)C'U + \frac{1}{2} x'(t)Yx(t)$$

s.t. $GU \leq W + Sx(t)$ where $U\cdot(x(t)) = [u'^*_0(x(t)) \ldots u'^*_{N-1}(x(t))]'$ is the optimal solution, H>0 and C, Y, G, W, S are matrices of appropriate dimensions. The MPC control algorithm is based on the following iterations: at time t, measure or estimate the current state x(t), solve the QP problem to get the optimal sequence if future input moves $U\cdot(x(t))$, $$u(t) = u^*_0(x(t))$$

To the process, discard the remaining optimal moves, repeat the procedure again at time t+1.

Figure 5:
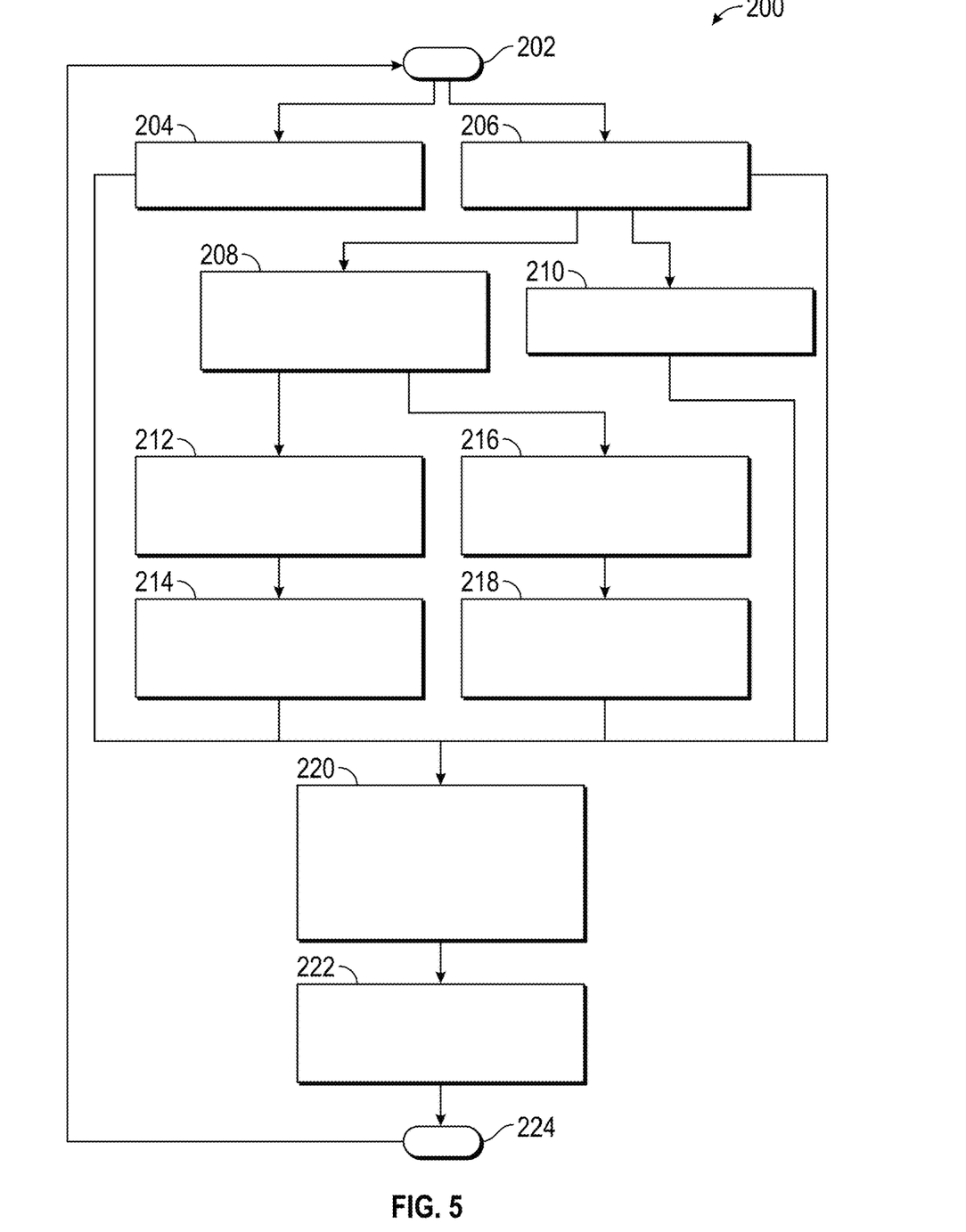
FIG. 5 is a flowchart depicting a method for model predictive control based management of chassis and driveline actuators according to an aspect of the present disclosure.

Referring now to FIG. 5, and with continuing reference to FIGS. 1-4, a method 200 of implementing MPC-based chassis and driveline actuator management in a motor vehicle 12 is shown. The method 200 begins at block 202. At block 204, the system 10 receives a driver control input 102 via the I/O ports 58 of the controller 14, and more specifically, of the DCI 104. The DCI 104 reads and interprets the driver control inputs 102 to generate a desired dynamics signal 106 in the form of an actuator output. At block 206, the system 10 obtains motor vehicle 12 state information measurements via the plurality of sensors 64 equipped to the motor vehicle 12. More specifically, at block 206, the controller 14 receives motor vehicle 12 state information reported by IMUs 66, SADS 68, GPS 70 sensors, and the like. The motor vehicle state information from the sensors 64 may be obtained continuously, cyclically, intermittently, or the like without departing from the scope or intent of the present disclosure.

At block 208 the motor vehicle 12 state information measurements are received and processed by the sensor/estimation module 110 and the feedback controller 112. More specifically, at block 208 the sensor/estimation module 110 executes control logic that processes the motor vehicle 12 state information measurements to generate estimations 116 for each of the various active chassis and dynamics systems equipped to the motor vehicle 12. In a particular example, the sensor/estimation module 110 includes an aerodynamics model estimation, an eLSD 36 model estimation, an eAWD 34 model estimation, and vehicle dynamics estimations. The aero model estimation calculates downforce and maximum downforce possible given current vehicle state information. Likewise, the eLSD 36 model estimation includes clutch torque estimations and maximum clutch torque capacity estimations. The eAWD 34 model estimation produces maximum electric motor 24 torque estimations. Finally, the vehicle dynamics estimations include vehicle states, road surface information, tire 18 force calculations, and road angles.

At block 210, the estimations 116 for each of the active chassis and dynamics systems from the sensor/estimation module 110 are received and processed by the DCI 104. More specifically, at block 210 the DCI 104 generates a desired dynamics signal 106. The desired dynamics signal 106 defines a desired output of the actuators 52 equipped to the motor vehicle 12 based on driver input and data from the sensors 64 and from the sensor/estimation module 110.

At block 212, the estimations 116 for each of the active chassis and dynamic systems from the sensor/estimation module 110 are received within the dynamic constraint calculator 114. The dynamic constraint calculator 114 applies actual physical limitations, and tire 18 and road grip limitations to signals from the sensor/estimation module 110. At block 214, the dynamic constraint calculator 114 generates control action constraints 122.

At block 216 the estimations 116 for each of the active chassis and dynamics systems from the sensor/estimation module 110 are received within the feed-forward controller 108 along with the control action constraints 122 from the dynamic constraint calculator 114. The feed-forward controller 108 processes the estimations 116 and control action constraints 122 and commands the actuators 52 to achieve certain transient response characteristics, provide optimal reference control actions 120, and linearize control responses around an operation point for each of the active chassis and dynamic systems equipped to the motor vehicle 12. In an example, the feed-forward controller 108 provides active aerodynamic preemptive control signals, eLSD 36 preemptive control signals, and eAWD 34 preemptive control signals. Preemptive control signals, adjust actuator 52 outputs to comport with control signal estimates from a sensor/estimation module 110. At block 218, the feed-forward controller 108 generates the reference control action 120.

At block 220, the feedback controller 112 receives and processes the control action constraints 122, the reference control action 120, the desired actuator output or desired dynamics signal 106, and the estimates and sensor measurements from the sensor/estimation module 110 and the sensors 64. More specifically, at block 220, the feedback controller 112 executes control logic that integrates the desired dynamics signal 106, reference control action 120, control action constraints 122, and measurements 124 into a model which accounts for body 62 and wheel 27 dynamics and in-plane and out-of-plane actuators 32, 42. The feedback controller 112 models electric motor 24 torque, eLSD 36 outputs, eAWD 34 outputs, combined tire 18 slip data, and active aerodynamic actuator 44 outputs, as well as front-to-rear and/or side-to-side interactions of various actuators 52 of the motor vehicle.

At block 222, the feedback controller 112 generates an optimal control action signal 126 that provides the motor vehicle 12 driver with desired motor vehicle 12 performance characteristics including, but not limited to maximum feasible performance, stability, handling, maneuverability, steerability. At block 224, the method 200 ends and returns to block 202 where the method 200 continuously operates while the motor vehicle 12 is in use.

The system 10 and method 200 of the present disclosure offer several advantages. These include providing a motor vehicle 12 driver or operator maximum feasible performance, stability, handling, maneuverability, steerability of the motor vehicle 12 in a wide variety of conditions, including in inclement weather, instances of tire 18 deformation, and the like. Additionally, the system 10 and method 200 may operate on a motor vehicle 12 in complex driving scenarios, including performance driving situations in which the driver may attempt a powerslide, drift, or the like, and the system 10 and method 200 will operate to provide an appropriate quantity of force generation at the tire 18/road interface or contact patch 38, while also providing maximum tire 18/road interface or contact patch 38 adhesion in driving scenarios in which maximum grip is desired. These benefits may all be obtained using the system 10 and method 200 described herein while maintaining or reducing cost and complexity, reducing calibration efforts, and improving simplicity, and while also providing increased redundancy and robustness.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for managing chassis and driveline actuators of a motor vehicle, the system comprising:
one or more sensors disposed on the motor vehicle, the one or more of sensors measuring real-time static and dynamic data about the motor vehicle;
one or more actuators disposed on the motor vehicle, the one or more actuators altering static and dynamic characteristics of the motor vehicle;
a control module having a processor, a memory, and input/output (I/O ports, the processor executing program code portions stored in the memory, the program code portions comprising:
a first program code portion that causes the one or more sensors to obtain vehicle state information;
a second program code portion that receives a driver input and generates a desired dynamic output based on the driver input and the vehicle state information;
a third program code portion that estimates actions of the one or more actuators based on the vehicle state information, wherein the vehicle state information includes a tire slip model that, for lateral force is expressed simply as:

$$F_y = G_{yk}F_{yp} + S_{Vyk};$$

and for longitudinal force, the tire slip model is expressed as:

$$F_x = (D_x \sin[C_x \tan^{-1}(B_x k_x - E_x(B_x k_x - \tan^{-1}(B_x k_x))] + S_{Vx})G_{xa};$$

where $G_{yk}$ is a weighting function expressed as:

$$G_{yk} = \frac{\cos[C_{yk}\tan^{-1}\{B_{yk}\kappa_s - E_{yk}(B_{yk}\kappa_s - \tan^{-1}(B_{yk}\kappa_s))\}]}{\cos[C_{yk}\tan^{-1}\{B_{yk}S_{Hyk} - E_{yk}(B_{yk}S_{Hyk} - \tan^{-1}(B_{yk}S_{Hyk}))\}]}$$

where $F_{yp}$ is a force of lateral slip in a pure slip condition, and where $G_{yk}=1$ and $S_{Vyk}=0$ when combined slip is not used;
a fourth program code portion that generates one or more control action constraints based on the first and third program code portions;
a fifth program code portion that generates a reference control action based on the vehicle state information, the estimated actions of the one or more actuators and the control action constraints, including an output command to one or more electronic limited slip differential (eLSD) actuators, an output command to one or more electronic all-wheel-drive (eAWD) actuators, and an output command to one or more active aerodynamic actuators, wherein the output commands to the one or more eLSD, eAWD, and active aerodynamic actuators are calculated to achieve specific transient response characteristics of the motor vehicle which are linearized;
a sixth program code portion that integrates the vehicle state information, the estimated actions of the one or more actuators, the desired dynamic output, the reference control action and the control action constraints to generate an optimal control action, wherein the optimal control action defines a modified driver desired dynamic output control signal to the one or more actuators of the motor vehicle that falls within a range of predefined actuator capacities, wherein the optimal control action manages chassis and driveline actuators, including the eLSD, the eAWD, and the active aerodynamic actuators, with the optimal control action, modifies and redistributes tire force generation in X and Y directions at a tire/road surface contact patch by adjusting torque delivered to each tire of the vehicle from a front to a rear of the vehicle and from side-to-side of the vehicle and maximizes driver control of the vehicle in complex driving scenarios.

2. The system of claim 1, wherein the one or more sensors further comprise at least one of:
inertial measurement units (IMUs) capable of measuring orientation in three dimensions, acceleration, and velocity;
Semi Active Damping Suspension (SADS) sensors capable of measuring orientation, position, velocity, acceleration in both linear and rotational aspects;
global positioning system (GPS) sensors capable of measuring a physical location of the motor vehicle;
wheel speed sensors;
throttle position sensors;
accelerator position sensors;
steering position sensors; and
tire pressure monitoring sensors.

3. The system of claim 1, wherein the real-time static and dynamic data further comprises:
lateral velocity;
longitudinal velocity;
yaw rate;
wheel angular velocity; and
longitudinal, lateral, and normal forces on each tire of the motor vehicle.

4. The system of claim 1, wherein the second program code portion receives one or more of:
a torque request from the driver; and
a steering input from the driver,
wherein based on measurements from the one or more sensors and an estimation of capacities of the one or more actuators, the torque request and the steering input from the driver are converted into a desired dynamic output that approximates vehicle dynamics that the driver input indicates.

5. The system of claim 4, wherein the third program code portion produces the estimation of capacities of the one or more actuators based on the vehicle state information and predetermined actuator capacity ranges.

6. The system of claim 1, wherein the fourth program code portion generates the one or more control action constraints from the vehicle state information and the estimation of capacities of the one or more actuators such that the control action constraints limit control signals to the one or more actuators to control actions possible within physical limitations or capacities of the actuators and fall within grip capacity of tires of the motor vehicle.

7. The system of claim 1 wherein the optimal control action generated by the sixth program code portion further comprises:
a control signal to the one or more actuators of the motor vehicle that achieves increases motor vehicle stability, handling, maneuverability, and steerability from a first level to a second level greater than the first level for a driver input and vehicle state information at a given point in time.

8. The system of claim 1 wherein the optimal control action defines a modified driver desired dynamic output control signal to the one or more actuators of the motor vehicle increases motor vehicle performance from a first level to a second level greater than the first level while reducing or substantially eliminating control interventions, such as: a traction control system (TCS) input, a stability control system input, an antilock braking system (ABS) input.

9. A method for managing chassis and driveline actuators of a motor vehicle, the method comprising:
processing a driver input through a control module having a processor, a memory, and input/output (I/O) ports, the processor executing program code portions stored in the memory, the program code portions:
obtaining vehicle state information from one or more sensors equipped to the motor vehicle, the one or more sensors measuring real-time static and dynamic data about the vehicle;
receiving the driver input and generating a desired dynamic output based on the driver input and the vehicle state information;
estimating actions of one or more actuators equipped to the motor vehicle based on the vehicle state information, the one or more actuators altering static and dynamic characteristics of the motor vehicle, wherein the vehicle state information includes a tire slip model that, for lateral force is expressed simply as:

$$F_y = G_{yk}F_{yp} + S_{Vyk};$$

and for longitudinal force, the tire slip model is expressed as:

$$F_x = (D_x \sin[C_x \tan^{-1}(B_x k_x - E_x(B_x k_x - \tan^{-1}(B_x k_x))] + S_{Vx})$$
$$G_{xa};$$

where $G_{yk}$ is a weighting function expressed as:

$$G_{yk} = \frac{\cos[C_{yk}\tan^{-1}\{B_{yk}\kappa_s - E_{yk}(B_{yk}\kappa_s - \tan^{-1}(B_{yk}\kappa_s))\}]}{\cos[C_{yk}\tan^{-1}\{B_{yk}S_{Hyk} - E_{yk}(B_{yk}S_{Hyk} - \tan^{-1}(B_{yk}S_{Hyk}))\}]}$$

where $F_{yp}$ is a force of lateral slip in a pure slip condition, and where $G_{yk}=1$ and $S_{Vyk}=0$ when combined slip is not used;
generating one or more control action constraints based on the vehicle state information and estimated actions of the one or more actuators equipped to the motor vehicle;
generating a reference control action based on the vehicle state information, estimated actions of the one or more actuators and the control action constraints, including generating an output command to one or more electronic limited slip differential (eLSD) actuators, an output command to one or more electronic all-wheel-drive (eAWD) actuators, and an output command to one or more active aerodynamic actuators, wherein the output commands to the one or more eLSD, eAWD, and active aerodynamic actuators are calculated to achieve specific transient response characteristics of the motor vehicle which are linearized;

integrating the vehicle state information, the estimated actions of the one or more actuators, the desired dynamic output, the reference control action and the control action constraints and generating an optimal control action based thereon, wherein the optimal control action defines a modified driver desired dynamic output control signal to the one or more actuators of the motor vehicle that falls within a range of predefined actuator capacities;

managing chassis and driveline actuators, including the eLSD, the eAWD, and the active aerodynamic actuators, with the optimal control action;

modifying and redistributing tire force generation in X and Y directions at a tire/road surface contact patch by adjusting torque delivered to each tire of the vehicle from a front to a rear of the vehicle and from side-to-side of the vehicle; and maximizing driver control of the vehicle in complex driving scenarios.

10. The method of claim 9, obtaining vehicle state information further comprises:

measuring orientation of the motor vehicle with inertial measurement units (IMUs) capable of measuring orientation, acceleration, and velocity in three or more degrees of freedom;

measuring orientation of motor vehicle suspension componentry with Semi Active Damping Suspension (SADS) sensors capable of measuring orientation, position, velocity, acceleration in both linear and rotational aspects;

measuring a physical location of the motor vehicle with global positioning system (GPS) sensors;

measuring motor vehicle wheel speed using wheel speed sensors;

measuring a throttle position of the motor vehicle with throttle position sensors;

measuring an accelerator pedal position with accelerator position sensors;

measuring steering movement with steering position sensors; and measuring tire information with tire pressure monitoring sensors.

11. The method of claim 9, wherein obtaining vehicle state information further comprises:

measuring a lateral velocity of the motor vehicle;
measuring a longitudinal velocity of the motor vehicle;
measuring a yaw rate of the motor vehicle;
measuring wheel angular velocity of the wheels of the motor vehicle; and
measuring longitudinal, lateral, and normal forces on each tire of the motor vehicle.

12. The method of claim 9, wherein receiving the driver input and generating a desired dynamic output based on the driver input and the vehicle state information further comprises:

receiving a torque request from the driver;
receiving a steering input from the driver; and based on measurements from the one or more sensors and an estimation of capacities of the one or more actuators, converting the torque request and the steering input from the driver into a desired dynamic output that approximates vehicle dynamics that the driver input indicates.

13. The method of claim 12, further comprising:
estimating capacities of the one or more actuators based on the vehicle state information and predetermined actuator capacity ranges.

14. The method of claim 9, further comprising:
generating the one or more control action constraints from the vehicle state information and the estimation of capacities of the one or more actuators such that the control action constraints limit control signals to the one or more actuators to control signals possible within physical limitations or capacities of the actuators and so that the control signals fall within grip capacity of tires of the motor vehicle.

15. The method of claim 9 wherein generating the optimal control action generated further comprises:
generating a control signal to the one or more actuators of the motor vehicle that achieves increases motor vehicle stability, handling, maneuverability, and steerability from a first level to a second level greater than the first level for a driver input and vehicle state information at a given point in time.

16. The method of claim 9, wherein generating the optimal control action further comprises:
generating a modified driver desired dynamic output control signal to the one or more actuators of the motor vehicle that increases motor vehicle performance from a first level to a second level greater than the first level; and
reducing or substantially eliminating control interventions from control systems including: a traction control system (TCS) input, a stability control system input, an antilock braking system (ABS) input.

17. A method for managing chassis and driveline actuators of a motor vehicle, the method comprising:
processing a driver input through a control module having a processor, a memory, and input/output (I/O) ports, the processor executing program code portions stored in the memory, the program code portions:
obtaining static and dynamic vehicle state information from one or more sensors equipped to the motor vehicle, the one or more sensors measuring orientation of the motor vehicle with inertial measurement units (IMUs) capable of measuring orientation, acceleration, and velocity in three or more degrees of freedom;
measuring orientation of motor vehicle suspension componentry with Semi Active Damping Suspension (SADS) sensors capable of measuring orientation, position, velocity, acceleration in both linear and rotational aspects;
measuring a physical location of the motor vehicle with global positioning system (GPS) sensors;
measuring motor vehicle wheel speed using wheel speed sensors;
measuring a throttle position of the motor vehicle with throttle position sensors;
measuring an accelerator pedal position with accelerator position sensors;
measuring steering movement with steering position sensors; and
measuring tire information with tire pressure monitoring sensors;
receiving the driver input including:
receiving a torque request from the driver;
receiving a steering input from the driver; and based on measurements from the one or more sensors and an estimation of capacities of the one or more actuators, converting the torque request and the steering input from the driver into a desired dynamic output that approximates vehicle dynamics that the driver input indicates;

estimating actions of one or more actuators equipped to the motor vehicle based on the vehicle state information, and estimating capacities of the one or more actuators based on the vehicle state information and predetermined actuator capacity ranges, the one or more actuators altering static and dynamic characteristics of the motor vehicle; wherein the vehicle state information includes a tire slip model that, for lateral force is expressed simply as:

$F_y = G_{yk}F_{yp} + S_{Vyk}$;

and for longitudinal force, the tire slip model is expressed as:

$F_x = (D_x \sin[C_x \tan^{-1}(B_x k_x - E_x(B_x k_x - \tan^{-1}(B_x k_x)))] + S_{Vx})G_{xa}$;

where $G_{yk}$ is a weighting function expressed as:

$$G_{yk} = \frac{\cos[C_{yk}\tan^{-1}\{B_{yk}\kappa_s - E_{yk}(B_{yk}\kappa_s - \tan^{-1}(B_{yk}\kappa_s))\}]}{\cos[C_{yk}\tan^{-1}\{B_{yk}S_{Hyk} - E_{yk}(B_{yk}S_{Hyk} - \tan^{-1}(B_{yk}S_{Hyk}))\}]}$$

where $F_{yp}$ is a force of lateral slip in a pure slip condition, and where $G_{yk}=1$ and $S_{Vyk}=0$ when combined slip is not used;

generating one or more control action constraints from the vehicle state information and the estimation of capacities of the one or more actuators such that the control action constraints limit control signals to the one or more actuators to control signals possible within physical limitations or capacities of the actuators and so that the control signals fall within grip capacity of tires of the motor vehicle;

generating a reference control action including:
  generating an output command to one or more electronic limited slip differential (eLSD) actuators;
  generating an output command to one or more electronic all-wheel-drive (eAWD) actuators; and
  generating an output command to one or more active aerodynamic actuators, and
  wherein the output commands to the one or more eLSD, eAWD, and active aerodynamic actuators are calculated to achieve specific transient response characteristics of the motor vehicle which are linearized; and integrating the vehicle state information, the estimated actions of the one or more actuators, the desired dynamic output, the reference control action and the control action constraints and generating an optimal control action based thereon, wherein the optimal control action defines a modified driver desired dynamic output control signal to the one or more actuators of the motor vehicle that falls within a range of predefined actuator capacities;

managing chassis and driveline actuators, including the eLSD, the eAWD, and the active aerodynamic actuators, with the optimal control action through modifying and redistributing tire force generation in X and Y directions at a tire/road surface contact patch by adjusting torque delivered to each tire of the vehicle from a front to a rear of the vehicle and from side-to-side of the vehicle and maximizing driver control of the vehicle in complex driving scenarios.

18. The method of claim 17 wherein obtaining vehicle state information further comprises:
  measuring a lateral velocity of the motor vehicle;
  measuring a longitudinal velocity of the motor vehicle;
  measuring a yaw rate of the motor vehicle;
  measuring wheel angular velocity of the wheels of the motor vehicle, and
  measuring longitudinal, lateral, and normal forces on each tire of the motor vehicle; and wherein generating an optimal control action further comprises:
  generating a control signal to the one or more actuators of the motor vehicle that achieves increases motor vehicle stability, handling, maneuverability, and steerability from a first level to a second level greater than the first level for a driver input and vehicle state information at a given point in time including:
  generating a modified driver desired dynamic output control signal to the one or more actuators of the motor vehicle that increases motor vehicle performance from a first level to a second level greater than the first level; and
  reducing or substantially eliminating control interventions from control systems including: a traction control system (TCS) input, a stability control system input, an antilock braking system (ABS) input.

* * * * *